United States Patent
Murata et al.

(10) Patent No.: US 10,421,154 B2
(45) Date of Patent: Sep. 24, 2019

(54) METHOD OF WELDING SHAFT AND WHEEL IN TURBINE SHAFT, TURBINE SHAFT, AND WELDING DEVICE

(71) Applicant: IHI Corporation, Koto-ku (JP)

(72) Inventors: Kenkichi Murata, Tokyo (JP); Kosuke Watanabe, Tokyo (JP); Koji Nezaki, Tokyo (JP); Yuuichi Miura, Tokyo (JP); Syoichiro Kaihara, Tokyo (JP)

(73) Assignee: IHI Corporation, Koto-ku (JP)

( * ) Notice: Subject to any disclaimer, the term of this patent is extended or adjusted under 35 U.S.C. 154(b) by 574 days.

(21) Appl. No.: 15/062,492

(22) Filed: Mar. 7, 2016

(65) Prior Publication Data

US 2016/0184930 A1 Jun. 30, 2016

Related U.S. Application Data

(63) Continuation of application No. PCT/JP2015/050436, filed on Jan. 9, 2015.

(30) Foreign Application Priority Data

Jan. 15, 2014 (JP) .................. 2014-005152

(51) Int. Cl.
*B23K 26/24* (2014.01)
*F02B 39/00* (2006.01)
(Continued)

(52) U.S. Cl.
CPC .......... *B23K 26/24* (2013.01); *B23K 15/0006* (2013.01); *B23K 26/0823* (2013.01);
(Continued)

(58) Field of Classification Search
CPC .......... F01D 5/025; F01D 5/063; F04D 29/04; F04D 29/043; F04D 29/044;
(Continued)

(56) References Cited

U.S. PATENT DOCUMENTS

2004/0057834 A1* 3/2004 Shimizu .................. F01D 5/025
416/244 A
2012/0076639 A1* 3/2012 Vazeille .................. F01D 5/063
415/111
(Continued)

FOREIGN PATENT DOCUMENTS

CN 101480760 A 7/2009
JP 2010-96115 4/2010
(Continued)

OTHER PUBLICATIONS

Office Action dated Jun. 1, 2017 in Chinese Patent Application No. 201580001880.7.
(Continued)

*Primary Examiner* — Christopher Verdier
*Assistant Examiner* — Elton K Wong
(74) *Attorney, Agent, or Firm* — Oblon, McClelland, Maier & Neustadt, L.L.P.

(57) ABSTRACT

Provided is a method of welding a shaft and a wheel in a turbine shaft. A target surface with a hole is provided to any one of the shaft and the wheel. An opposed surface is provided to the other one of the shaft and the wheel. The opposed surface includes an opposed portion opposed to the target surface, and a non-opposed portion formed continuously from the opposed portion toward a center side while facing onto the hole. The welding method includes: disposing the target surface and the opposed surface such that the they are opposed to each other while establishing a state of surface contact; and welding them by beam irradiation from outside in a radial direction of the shaft toward inside in the radial direction thereof based on a condition to cause a depth of fusion to reach a position on a center side beyond the opposed portion.

4 Claims, 5 Drawing Sheets

(51) Int. Cl.
| | |
|---|---|
| *F01D 5/02* | (2006.01) |
| *B23K 26/08* | (2014.01) |
| *B23K 33/00* | (2006.01) |
| *B23K 26/32* | (2014.01) |
| *B23K 26/323* | (2014.01) |
| *B23K 26/282* | (2014.01) |
| *B23K 26/12* | (2014.01) |
| *B23K 15/00* | (2006.01) |
| *B23K 101/00* | (2006.01) |
| *B23K 103/04* | (2006.01) |
| *B23K 103/08* | (2006.01) |
| *B23K 103/18* | (2006.01) |

(52) U.S. Cl.
CPC .......... *B23K 26/12* (2013.01); *B23K 26/1224* (2015.10); *B23K 26/282* (2015.10); *B23K 26/32* (2013.01); *B23K 26/323* (2015.10); *B23K 33/006* (2013.01); *F01D 5/025* (2013.01); *F02B 39/00* (2013.01); *B23K 2101/001* (2018.08); *B23K 2103/04* (2018.08); *B23K 2103/08* (2018.08); *B23K 2103/18* (2018.08); *F05D 2220/40* (2013.01); *F05D 2230/232* (2013.01)

(58) Field of Classification Search
CPC ...... F04D 29/053; F04D 29/054; F04D 29/20; F04D 29/263; F04D 29/266; B23K 2101/001; B23K 15/00; B23K 15/0006; F02B 37/00; F02B 39/00; F05D 2230/232; F05D 2230/233
USPC .......................................... 416/244 R, 244 A
See application file for complete search history.

(56) References Cited

U.S. PATENT DOCUMENTS

| | | | | |
|---|---|---|---|---|
| 2013/0343899 | A1* | 12/2013 | Nishioka | B23K 9/044 416/229 R |
| 2014/0178188 | A1* | 6/2014 | Li | F01D 5/3061 415/185 |
| 2015/0159487 | A1* | 6/2015 | Thirion | F01D 5/025 416/213 R |

FOREIGN PATENT DOCUMENTS

| | | |
|---|---|---|
| JP | 2011-112039 | 6/2011 |
| JP | 2011-202575 | 10/2011 |
| JP | 2012-57577 | 3/2012 |
| JP | 2012-61496 | 3/2012 |
| JP | 2012-137099 | 7/2012 |
| JP | 2013-170487 | 9/2013 |
| JP | 2014-177933 A | 9/2014 |

OTHER PUBLICATIONS

International Search Report dated Mar. 10, 2015 in PCT/JP2015/050436, filed Jan. 9, 2015 (with English Translation).
Written Opinion dated Mar. 10, 2015 in PCT/JP2015/050436, filed Jan. 9, 2015.
Japanese Office Action dated Feb. 21, 2017 in Patent Application No. 2015-557813.

* cited by examiner

METHOD OF WELDING SHAFT AND WHEEL IN TURBINE SHAFT, TURBINE SHAFT, AND WELDING DEVICE

CROSS REFERENCE TO RELATED APPLICATIONS

This application is a continuation application of International Application No. PCT/JP2015/050436, filed on Jan. 9, 2015, which claims priority to Japanese Patent Application No. 2014-005152, filed on Jan. 15, 2014, the entire contents of which are incorporated by reference herein.

BACKGROUND

1. Technical Field

The present disclosure relates to a method of welding a shaft and a wheel in a turbine shaft, a turbine shaft, and a welding device.

2. Description of the Related Art

A conventional turbocharger includes a bearing housing, a turbine shaft rotatably supported by the bearing housing, a turbine wheel provided at one end of the turbine shaft, and a compressor wheel provided at another end of the turbine shaft. The turbocharger is connected to an engine, and the turbine wheel is rotated by exhaust gas discharged from the engine. Moreover, the rotation of the turbine wheel rotates the compressor wheel through a shaft. Thus, the turbocharger compresses air with the rotation of the compressor wheel and sends the compressed air to the engine.

The turbine shaft is formed by welding the shaft and the turbine wheel. For example, laser welding, electron beam welding, or the like is used as welding means as shown in Japanese Patent Application Laid-open Publication No. 2012-137099.

SUMMARY

There has been a demand for reduction in size of a turbocharger in recent years. In order to secure an output in accordance with an engine capacity while meeting this demand, there has been a demand to rotate the turbine shaft at a higher speed.

Accordingly, in the course of welding the turbine shaft as mentioned above, it is desired that a welding condition be appropriately set and welding quality be further improved.

An object of the present disclosure is to provide a method of welding a shaft and a wheel in a turbine shaft, a turbine shaft, and a welding device, which are capable of improving welding quality of a turbine shaft.

A first aspect of the present disclosure provides a method of welding a shaft and a wheel in a turbine shaft, in which: an annular target surface is provided to any one of the shaft and the wheel, the target surface including an internal hole receding in a direction of a rotation axis; an opposed surface is provided to the other one of the shaft and the wheel, the opposed surface including an opposed portion opposed to the target surface, and a non-opposed portion formed continuously from the opposed portion toward a center side while facing onto the internal hole; and the turbine shaft lacks a structure to define relative positions of the shaft and the wheel by engagement with each other. The method includes: disposing the target surface and the opposed surface such that the target surface and the opposed surface are opposed to each other in the direction of the rotation axis while establishing a state of surface contact; and welding the target surface and the opposed surface by beam irradiation to the target surface and the opposed surface from outside in a radial direction of the shaft toward inside in the radial direction of the shaft based on a condition to cause a depth of fusion to reach a position on the center side beyond the opposed portion.

The non-opposed portion of the opposed surface may be provided with a protrusion protruding in the direction of the rotation axis, the protrusion being inserted into the internal hole, and located away from an inner peripheral surface of the internal hole in the radial direction of the shaft. The welding may include the beam irradiation performed such that the depth of fusion is located between the inner peripheral surface of the internal hole and an outer peripheral surface of the protrusion.

The non-opposed portion of the opposed surface may be provided with a small-diameter hole, the small-diameter hole receding in the direction of the rotation axis and having a smaller diameter than a diameter of the internal hole. The welding may include the beam irradiation performed such that the depth of fusion is located between the inner peripheral surface of the internal hole and an inner peripheral surface of the small-diameter hole.

The welding of the target surface and the opposed surface may be implemented by emitting a laser beam as the beam irradiation under a reduced pressure environment.

A second aspect of the present disclosure provides a turbine shaft formed by the method of welding according to the first aspect.

A third aspect of the present disclosure provides a welding device configured to weld a shaft and a wheel in a turbine shaft, in which: an annular target surface is provided to any one of the shaft and the wheel, the target surface including an internal hole receding in a direction of a rotation axis; an opposed surface is provided to the other one of the shaft and the wheel, the opposed surface including an opposed portion opposed to the target surface, and a non-opposed portion formed continuously from the opposed portion toward a center side while facing onto the internal hole; and the turbine shaft lacks a structure to define relative positions of the shaft and the wheel by engagement with each other. The welding device includes: a chuck unit configured to dispose the target surface and the opposed surface such that the target surface and the opposed surface are opposed to each other in the direction of the rotation axis while establishing a state of surface contact; and a welding unit configured to weld the target surface and the opposed surface by beam irradiation to the target surface and the opposed surface from outside in a radial direction of the shaft toward inside in the radial direction of the shaft, such that a depth of fusion reaches a position on the center side beyond the opposed portion.

A fourth aspect of the present disclosure provides a turbine shaft including a shaft and a wheel to be joined together by welding, the shaft and the wheel lacking a structure to define relative positions of the shaft and the wheel by engagement with each other. Any one of the shaft and the wheel includes an annular target surface provided with an internal hole receding in a direction of a rotation axis . The other one of the shaft and the wheel includes an opposed surface provided with an opposed portion opposed to the target surface, and a non-opposed portion formed continuously from the opposed portion toward a center side while facing onto the internal hole. A fused region reaches from a junction between the target surface and the opposed portion to the non-opposed portion of the opposed surface, the fused region formed by being fused in association with welding of the target surface and the opposed portion and then being solidified.

The opposed surface may include a protrusion formed on the non-opposed portion and protruding in the direction of the rotation axis. An outer peripheral surface of the protrusion may be located away from an inner peripheral surface of the internal hole in a radial direction of the shaft while interposing the non-opposed portion between the outer peripheral surface and the inner peripheral surface. An end portion of the fused region on inside in the radial direction may be located at the non-opposed portion.

The present disclosure can improve welding quality of a turbine shaft.

DESCRIPTION OF THE EMBODIMENTS

Figure 1A:
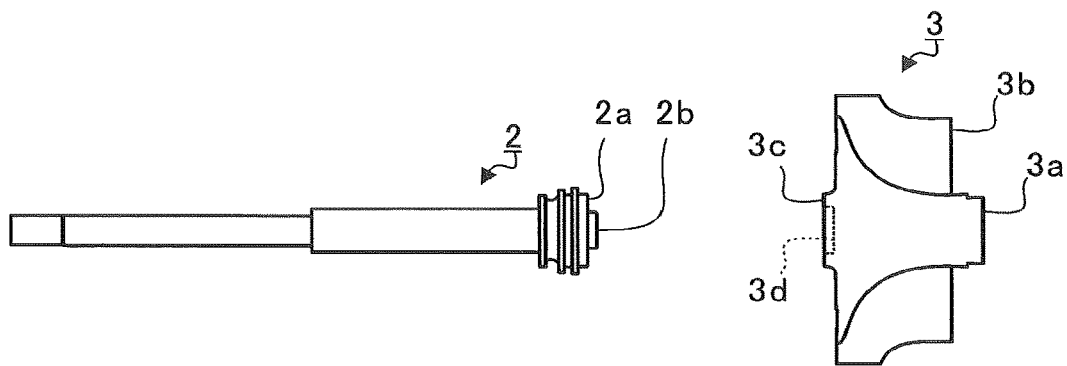
FIG. 1A and FIG. 1B are views for explaining a turbine shaft according to an embodiment of the present disclosure.

An embodiment of the present disclosure will be described below in detail with reference to the accompanying drawings. It is to be noted that dimensions, materials, specific numerical values, and the like shown in the embodiment are mere examples for facilitating the understanding of the disclosure. Accordingly, these factors are not intended to limit the present disclosure unless otherwise stated. Meanwhile, in the specification and the drawings, constituents having substantially the same functions or configurations will be denoted by the same reference numerals in order to omit overlapping explanations, and illustration of elements not directly related to the present disclosure will be omitted.

(Turbine Shaft 1)

Figure 1B:
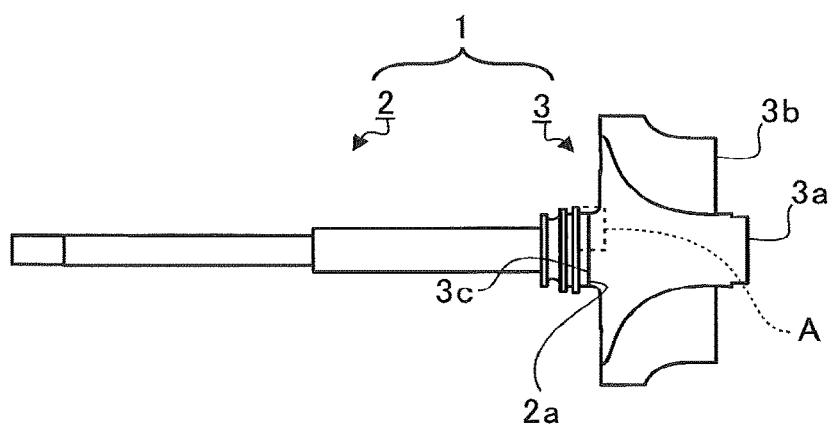

FIG. 1A and FIG. 1B are views for explaining a turbine shaft 1. FIG. 1A is a side view of a state before a shaft 2 and a turbine wheel 3 (a wheel) are welded together. FIG. 1B is a side view of the turbine shaft 1 after the turbine wheel 3 and the shaft 2 are welded together.

As shown in FIG. 1A, the shaft 2 has one end surface 2a (an opposed surface) located at one end in a direction of a rotation axis and opposed to the turbine wheel 3. A protrusion 2b protruding in the direction of the rotation axis is formed on the one end surface 2a.

Meanwhile, the turbine wheel 3 includes a hub 3a and multiple blades 3b provided on an outer peripheral surface of the hub 3a. An internal hole (a recess) 3d is formed in a bottom surface 3c (a target surface) of the hub 3a. The internal hole 3d recedes in an axial direction of the shaft 2. An inside diameter of the internal hole 3d is greater than an outside diameter of the protrusion 2b of the shaft 2. Accordingly, the protrusion 2b is insertable into the internal hole 3d.

As shown in FIG. 1B, the protrusion 2b of the shaft 2 is inserted into the internal hole 3d of the turbine wheel 3, and the one end surface 2a of the shaft 2 comes into contact with the bottom surface 3c of the turbine wheel 3. In the state of maintaining the contact, outer peripheries of the one end surface 2a and the bottom surface 3c are irradiated with a beam and welded together. Hence, the turbine wheel 3 is joined to the shaft 2, and the turbine shaft 1 is thus formed. In the following, a welding device to weld the shaft 2 and the turbine wheel 3 together will be described.

(Welding Device 100)

Figure 2:
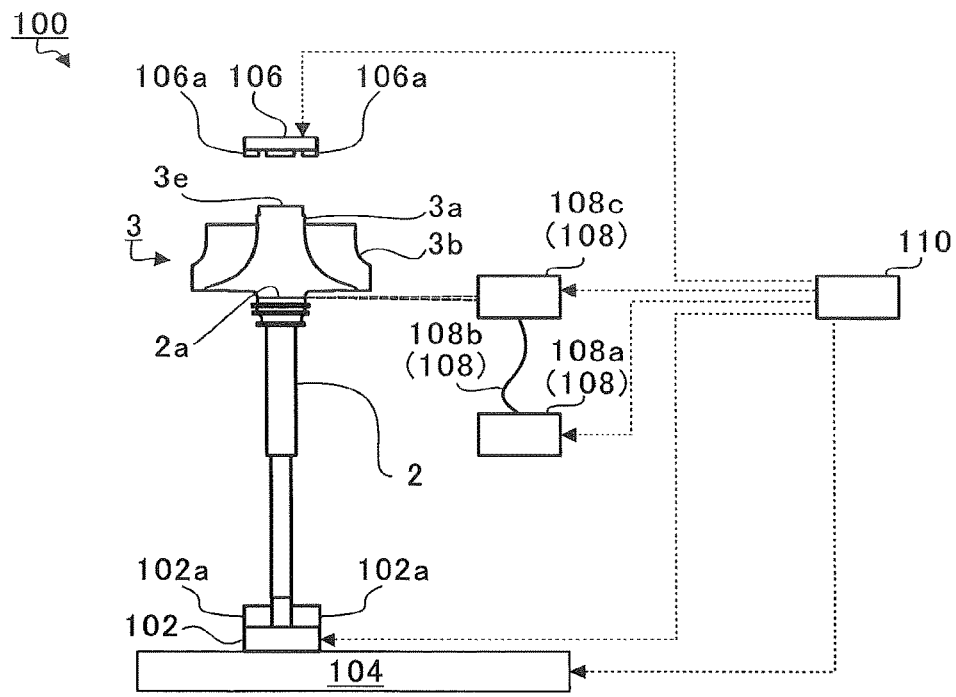
FIG. 2 is a schematic diagram of a welding device according to the embodiment of the present disclosure.

FIG. 2 is a schematic diagram of a welding device 100. In FIG. 2, flows of control signals are indicated with dashed arrows. A first holder 102 shown in FIG. 2 is formed from a chuck device or the like, which includes three jaws 102a to be driven by a not-illustrated actuator. The first holder 102 is provided on a turntable 104. Then, the three jaws 102a pinch an end portion of the shaft 2 located on an opposite side from the one end surface 2a. Thus, the first holder 102 holds the shaft 2. In the meantime, the first holder 102 is fixed to an output shaft of a not-illustrated motor, and is rotated about the rotation axis of the shaft 2 thus held.

A second holder 106 (a chuck unit) is formed from a chuck device or the like, which includes three jaws 106a to be driven by an actuator (not shown). The three jaws 106a pinch a boss 3e of the hub 3a of the turbine wheel 3. Thus, the second holder 106 holds the turbine wheel 3.

The second holder 106 is fixed to a robotic arm (not shown). By driving the robotic arm, the second holder 106 keeps hold of the turbine wheel 3 and conveys the turbine wheel 3 to the one end surface 2a side of the shaft 2.

A welding unit 108 includes an oscillator 108a, an optical fiber 108b, and a collector 108c. The oscillator 108a generates light by excitation of a laser medium (not shown). The generated light is guided to the collector 108c through the optical fiber 108b, and is emitted to a portion to be welded while being collected by the collector 108c.

A controller 110 is formed from a semiconductor integrated circuit which includes a central processing unit (CPU), a ROM which stores a program and the like, a RAM as a work area, and the like. The controller 110 controls the first holder 102, the turntable 104, the second holder 106, and the welding unit 108. Moreover, the controller 110 also controls the robotic arm, the actuators, and the motor provided in the welding device 100.

(Welding Method)

Figure 3:
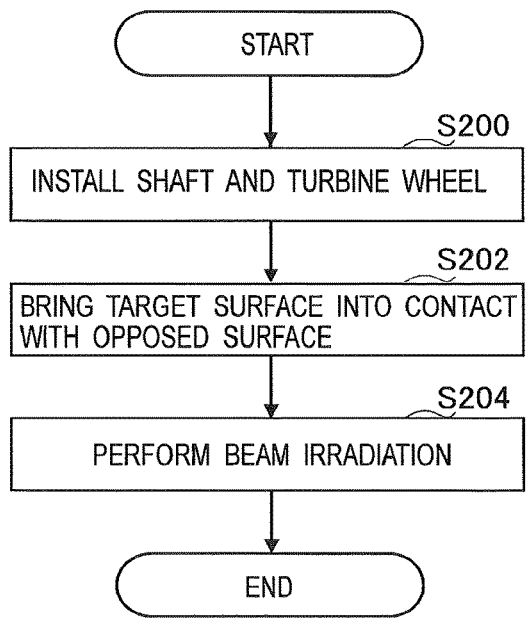
FIG. 3 is a flowchart for explaining a welding method according to the embodiment of the present disclosure.

Next, a method of welding the shaft 2 and the turbine wheel 3 of the turbine shaft 1 by using the welding device 100 will be described. FIG. 3 is a flowchart for explaining the welding method of this embodiment. In the first place, on the turntable 104, the first holder 102 is provided at a retracted position not opposed to the second holder 106. Then, the controller 110 controls the not-illustrated robotic arm, thereby installing the shaft 2 on the first holder 102.

The first holder 102 holds the shaft 2 by driving the three jaws 102a. Thereafter, when the turntable 104 is rotated and the shaft 2 comes close to the second holder 106, the second holder 106 holds the boss 3e of the turbine wheel 3 by driving the three jaws 106a, then conveys the turbine wheel 3 to the one end surface 2a side of the shaft 2, and installs the turbine wheel 3 thereon (S200).

Then, the second holder 106 causes either the center in a radial direction of the bottom surface 3c of the turbine wheel 3 or a position in the radial direction of the bottom surface 3c corresponding to the center of gravity of the turbine wheel 3 to coincide with the center of the one end surface 2a of the shaft 2. In this state, the second holder 106 disposes the bottom surface 3c and the one end surface 2a such that the target surface and the opposed surface are opposed to each other in the direction of the rotation axis while establishing a state of surface contact (S202). Here, the position in the radial direction of the bottom surface 3c corresponding to the center of gravity of the turbine wheel 3 can be specified by measuring the position of the center of gravity of the turbine wheel 3 in advance. Note that the shaft 2 and the turbine wheel 3 do not jointly have a spigot structure as described later. Accordingly, relative positions of the shaft 2 and the turbine wheel 3 in the welding process are defined by the first holder 102 and the second holder 106.

Furthermore, the turntable 104 is rotated and the shaft 2 and the turbine wheel 3 come close to the welding unit 108. Then, the welding unit 108 performs beam irradiation to the bottom surface 3c and the one end surface 2a from the outside in the radial direction of the shaft 2 toward the inside in the radial direction thereof so as to achieve a certain depth of fusion to be described later (S204).

At this time, the first holder 102 is rotated by the motor while the shaft 2 and the turbine wheel 3 are rotated about the rotation axis of the shaft 2. In this way, the laser beam scans the entire outer peripheries of the bottom surface 3c and the one end surface 2a, whereby the bottom surface 3c and the one end surface 2a are welded together.

Next, a detailed description will be given below of the depth of fusion in the case where the welding unit 108 performs beam irradiation to the bottom surface 3c and the one end surface 2a according to the welding method and the welding device 100 of this embodiment.

Figure 4A:
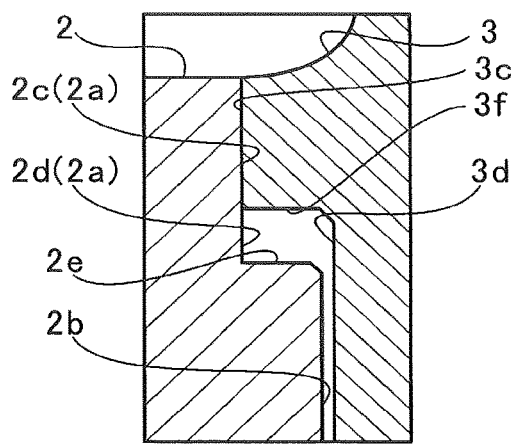
FIG. 4A to FIG. 4C are diagrams for explaining a depth of fusion.
Figure 4B:
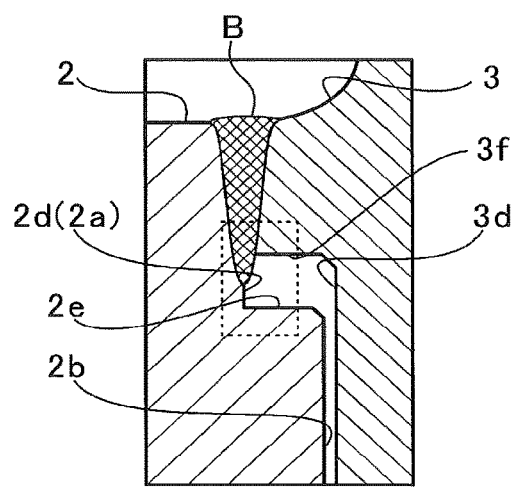
Figure 4C:
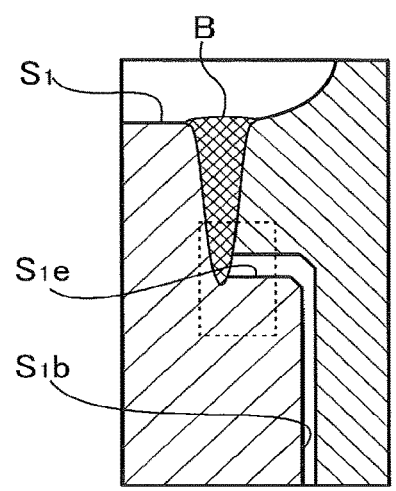

FIG. 4A to FIG. 4C are diagrams for explaining the depth of fusion. FIG. 4A shows a cross section of a portion A indicated with a dashed line in FIG. 1B inclusive of the shaft center of the shaft 2, which illustrates the shaft 2 and the turbine wheel 3 before being welded together.

As shown in FIG. 4A, the one end surface 2a of the shaft 2 includes an opposed portion 2c and a non-opposed portion 2d. The opposed portion 2c is a region, which is opposed to and comes into surface contact with the bottom surface 3c of the turbine wheel 3 in a state of opposition (a state of coaxial opposition) where the center of the one end surface 2a in the radial direction of the shaft 2 coincides with either the center in the radial direction of the bottom surface 3c or the position in the radial direction thereof corresponding to the center of gravity of the turbine wheel 3.

Meanwhile, the non-opposed portion 2d is a region not opposed to the bottom surface 3c of the turbine wheel 3 in the above-mentioned state of coaxial opposition. The non-opposed portion 2d is a region formed continuously from the opposed portion 2c toward the center side while facing onto the internal hole 3d. The bottom surface 3c has an annular shape with the internal hole 3d formed on the inside in the radial direction. The non-opposed portion 2d is formed by this shape.

The protrusion 2b is formed at the non-opposed portion 2d of the one end surface 2a. The protrusion 2b is inserted into the internal hole 3d. Meanwhile, the protrusion 2b is located away from an inner peripheral surface 3f of the internal hole 3d in the radial direction of the shaft 2 while locating the non-opposed portion 2d in between. In other words, the shaft 2 and the turbine wheel 3 do not jointly have a spigot structure (a spigot (joint) structure). Here, the spigot structure is a structure that defines relative positions between two components, as typified by a recess and a protrusion, by means of engagement with each other. Regarding two components which jointly have the spigot structure, for example, an outer peripheral surface of one of the members is inserted into (engaged with) an inner peripheral surface of the other member in a relatively sliding manner.

In each of FIG. 4B and FIG. 4C, a region (a fused region) B once fused and then solidified in association with the beam irradiation of the shaft 2 and the turbine wheel 3 is illustrated by cross hatching. A key hole is formed when deep penetration welding (key-hole welding, key-hole mode welding) is performed by means of the beam irradiation. Here, the deep penetration welding is a welding mode which involves a relatively high power density and forms a molten pool having a larger depth than its width. The key hole is a depression which is formed by a reaction force occurring when a metal fused in the molten pool evaporates and the evaporating metal separates from a surface thereof.

In this embodiment, as shown in FIG. 4B, the depth of fusion of the region B reaches a position on the center side beyond the opposed portion 2c. In other words, the region B reaches from a junction between the target surface 3c and the opposed portion 2c to the non-opposed portion 2d. To be more precise, an end portion of the region B on the inside in the radial direction of the shaft 2 (a lower side in FIG. 4) is located at the non-opposed portion 2d of the one end surface 2a, which is located between an outer peripheral surface 2e of the protrusion 2b and the inner peripheral surface 3f of the internal hole 3d. That is, this end portion does not reach the outer peripheral surface 2e of the protrusion 2b. On the other hand, in a comparative example shown in FIG. 4C, an end portion of a region B on the inside in a radial direction of a shaft S1 (a lower side in FIG. 4) reaches a position on the inside in the radial direction of the shaft S1 beyond an outer peripheral surface S1e of a protrusion S1b. In other words, the key hole reaches the position on the inside in the radial direction of the shaft S1 beyond the outer peripheral surface S1e of the protrusion S1b.

In the comparative example, a section from the non-opposed portion 2d to the protrusion S1b is fused continuously. Accordingly, there is a large amount of flow of the metal remaining on the outer peripheral surface S1e of the protrusion S1b as a consequence of the fusion. When the fused metal remains on the outer peripheral surface S1e of the protrusion S1b and is then solidified, the fused metal may a shape similar to a crack (a pseudo-crack) depending on the welding condition. Moreover, a welded region is likely to form porosity (voids) as a result of taking in ambient gas (such as the air) during the welding. If the pseudo-crack or the porosity is formed as described above, strength of the welded region may be deteriorated depending on where the region is generated. As a consequence, it is necessary to manage various welding conditions more strictly.

Here, the shaft 2 and the turbine wheel 3 can be made of mutually different metal materials. For example, the shaft 2 is made of chrome steel such as SCM or SCr. Meanwhile, the turbine wheel 3 is made of a Ni-based superalloy that is excellent in heat resistance and oxidation resistance, or the like.

Accordingly, in this embodiment, the welding unit 108 performs the beam irradiation to the bottom surface 3c and the one end surface 2a from the outside in the radial direction of the shaft 2 toward the inside in the radial direction thereof such that the depth of fusion is located between the inner peripheral surface 3f of the internal hole 3d and the outer peripheral surface 2e of the protrusion 2b. To be more precise, appropriate welding conditions for achieving the above-described welding are specified by repeating welding processes, analyses of the welded region after the welding, and so forth. Then, the welding is performed in accordance with the specified welding conditions. That is, the welding is performed based on the welding conditions that achieve the desired depth of fusion mentioned above (in other words, by using these conditions). The welding conditions are saved as data in the controller 110, for example, and are read out at the start of welding and used for controlling the welding.

As a result, there is a small amount of flow of the metal remaining at the protrusion 2b and the pseudo-crack or the porosity as in the comparative example is less likely to be formed. Accordingly, it is possible to improve welding quality.

Meanwhile, even if part of the beam having penetrated the inner peripheral surface 3f reaches the protrusion 2b and fuses part of the protrusion 2b, the beam emitted to the non-opposed portion 2d side does not reach the protrusion 2b. For this reason, the fused portion does not continue from the non-opposed portion 2d to the protrusion 2b.

Figure 5A:
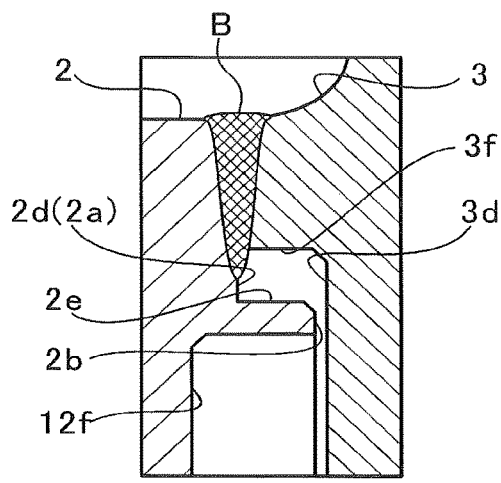
FIG. 5A to FIG. 5D are diagrams for explaining first to fourth modified examples of the embodiment of the present disclosure, respectively.

FIG. 5A to FIG. 5D are diagrams for explaining first to fourth modified examples of the embodiment, respectively. In the first modified example, an opposed hole 12f is formed in the protrusion 2b as shown in FIG. 5A. The opposed hole 12f recedes in the direction of the rotation axis and is opposed to the internal hole 3d.

Figure 5B:
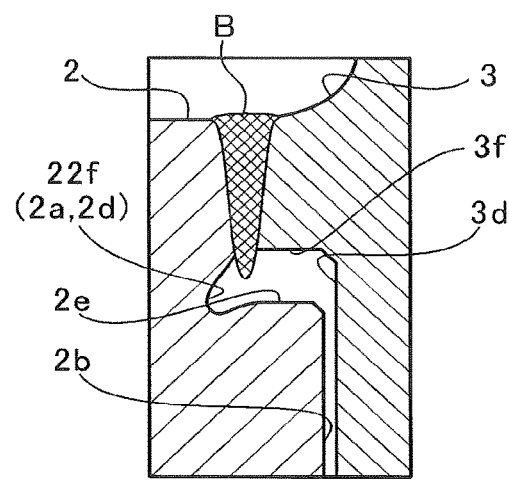

In the second modified example, an annular groove 22f is formed in the non-opposed portion 2d of the one end surface 2a as shown in FIG. 5B. The annular groove 22f recedes in the direction of the rotation axis relative to the opposed portion 2c of the one end surface 2a, and is formed annularly around the protrusion 2b.

As with the above-described embodiment, in each of the first modified example and the second modified example, the welding unit 108 performs the beam irradiation to the bottom surface 3c and the one end surface 2a from the outside in the radial direction of the shaft 2 toward the inside in the radial direction thereof such that the depth of fusion is located between the inner peripheral surface 3f of the internal hole 3d and the outer peripheral surface 2e of the protrusion 2b. For this reason, the pseudo-crack or the porosity is less likely to be formed, and it is thus possible to improve welding quality. Here, even when fused particles (so-called spatter) are generated at the time of the welding, outer peripheral surface 2e receives such fused particulates. Thus, the fused particles are prevented from scattering. Moreover, since the fused particulates remain on the outer peripheral surface 2e, occurrence of abnormal noise attributed to collisions of solidified fused particles is suppressed as well.

Meanwhile, the annular groove 22f is formed in the second modified example. Accordingly, the fused metal spreads into the annular groove 22f as well. As a consequence, a thickness of the fused metal is reduced. In addition, the pseudo-crack or the porosity is less likely formed.

Figure 5C:
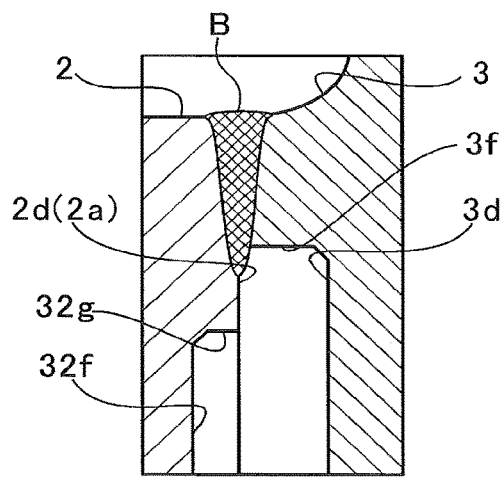

In the third modified example, a small-diameter hole 32f having a smaller diameter than that of the internal hole 3d is provided in the non-opposed portion 2d of the one end surface 2a as shown in FIG. 5C. The small-diameter hole 32f recedes from the one end surface 2a in the direction of the rotation axis. In this case, the beam irradiation is performed in the step of welding the shaft 2 and the turbine wheel 3, such that the depth of fusion is located between the inner peripheral surface 3f of the internal hole 3d and an inner peripheral surface 32g of the small-diameter hole 32f.

Figure 6A:
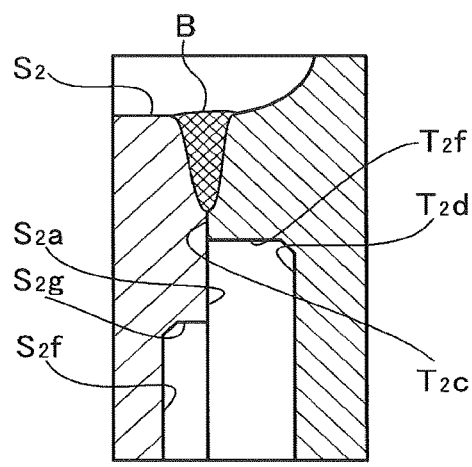
FIG. 6A and FIG. 6B are diagrams for explaining comparative examples to the third modified example shown in FIG. 5C.
Figure 6B:
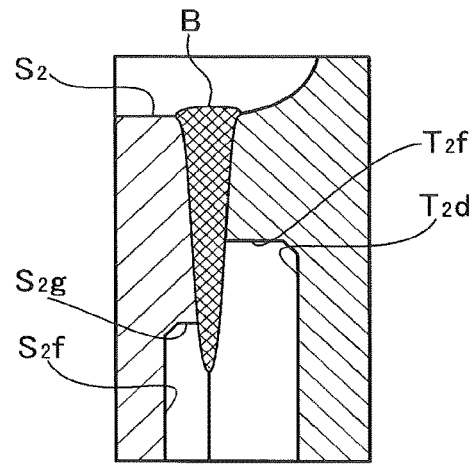

FIG. 6A and FIG. 6B are diagrams for explaining comparative examples to the third modified example. In the comparative example shown in FIG. 6A, an end portion of a region B on the inside in a radial direction of a shaft S2 (a lower side in FIG. 6) does not reach an inner peripheral surface T2f of an internal hole T2d. In this case, the welded area between an opposed surface S2a and a target surface T2c is smaller than that in the third modified example. Accordingly, there is a risk of a failure to secure sufficient welding strength.

In the meantime, in the comparative example shown in FIG. 6B, the end portion of the region B on the inside in the radial direction of the shaft S2 (a lower side in FIG. 6) reaches a position close to the inside in the radial direction beyond an inner peripheral surface S2g of a small-diameter hole S2f. For this reason, the fused metal may fail to remain on the opposed surface S2a and to drip off in the internal hole T2d and the small-diameter hole S2f. As a consequence, the center of gravity in the direction of rotation of the turbine shaft may be biased.

As shown in FIG. 5C, in the third modified example, the beam irradiation is performed in the step of welding the shaft 2 and the turbine wheel 3, such that the depth of fusion is located between the inner peripheral surface 3f of the internal hole 3d and the inner peripheral surface 32g of the small-diameter hole 32f. In this way, it is possible to improve welding quality.

Figure 5D:
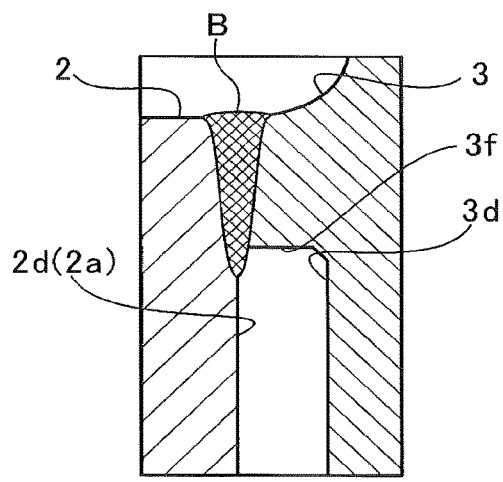

As shown in FIG. 5D, the protrusion 2b shown in the above-described embodiment is not provided in the fourth modified example. Here, the small-diameter hole 32f as in the third modified example is not provided either. Nonetheless, as with the first to third modified examples, the welding unit 108 welds the bottom surface 3c and the one end surface 2a together by beam irradiation to the bottom surface 3c and the one end surface 2a from the outside in the radial direction of the shaft 2 toward the inside in the radial direction thereof, such that the depth of fusion reaches a position on the center side beyond the opposed portion 2c. Accordingly, it is possible to improve welding quality while avoiding a situation like the comparative example shown in FIG. 6A, in which the end portion of the region B on the inside in the radial direction of the shaft 2 (the lower side in FIG. 6), after the fusing and the solidification of the region B, does not reach the inner peripheral surface 3f of the internal hole 3d.

Each of the embodiment and the modified examples mentioned above describes the case in which the turbine wheel 3 includes the annular bottom surface 3c provided with the internal hole 3d, and the shaft 2 includes the one end surface 2a opposed to the bottom surface 3c. However, an annular target surface provided with an internal hole may be provided to a turbine wheel and an opposed surface opposed to the target surface may be provided to a shaft instead.

Meanwhile, each of the embodiment and the modified examples mentioned above describes the case in which the welding device 100 welds the shaft 2 and the turbine wheel 3 together by laser welding. Instead, a welding device may weld the shaft 2 and the turbine wheel 3 together by electron beam welding.

In the case of electron beam welding, a welding step of welding the bottom surface 3c (the target surface) of the hub 3a of the turbine wheel 3 and the one end surface 2a (the opposed surface) of the shaft 2 is performed under a reduced pressure environment. Meanwhile, in the case of laser welding, the welding step is performed under an atmospheric pressure in general. However, in the welding step of the present disclosure, the laser beam is emitted as the beam irradiation under a reduced pressure environment which is almost a vacuum. Thus, it is possible to synergistically improve welding quality. Specifically, the ambient gas such as the air is further inhibited from being taken into the fused metal during the welding, whereby an effect to suppress the porosity is further enhanced.

Although the embodiment of the present disclosure has been described above with reference to the accompanying drawings, it is a matter of course that the present disclosure is not limited only to the embodiment. It is obvious to those skilled in the art that various modifications and changes can be made within the scope as defined in the appended claims. It is to be also understood that those modifications and changes are naturally encompassed by the technical scope of the present disclosure as well.

Note that the steps in the welding method of this specification do not always have to be performed in chronological order as described in the flowchart.

What is claimed is:

1. A turbine shaft comprising:
a shaft and a wheel to be joined together by welding, the shaft and the wheel lacking a structure to regulate relative displacements of positions of the shaft and the wheel in a radial direction of the turbine shaft by fit with each other, wherein
any one of the shaft and the wheel includes an annular target surface provided with an internal hole receding in a direction of a rotation axis,
the other one of the shaft and the wheel includes an opposed surface provided with
an opposed portion opposed to the target surface, and
a non-opposed portion extending from the opposed portion toward a center side of the turbine shaft while facing onto the internal hole,
a fused region reaches from a junction between the target surface and the opposed portion to the non-opposed portion of the opposed surface, the fused region formed by being fused in association with welding of the target surface and the opposed portion and then being solidified,
the opposed surface includes a protrusion formed on the non-opposed portion and protruding in the direction of the rotation axis,
an outer peripheral surface of the protrusion is located radially inward of and away from an inner peripheral surface of the internal hole, and
an end portion of the fused region is located between the outer peripheral surface of the protrusion and the inner peripheral surface of the internal hole.

2. The turbine shaft according to claim 1, wherein
the fused region is formed by the welding with beam irradiation to the target surface and the opposed surface from an outside of the turbine shaft in the radial direction of the turbine shaft.

3. The turbine shaft according to claim 1, wherein
the protrusion is provided with an opposed hole opening toward the internal hole.

4. The turbine shaft according to claim 1, wherein
the non-opposed portion is provided with an annular groove formed around the protrusion.

* * * * *